Figure 1:
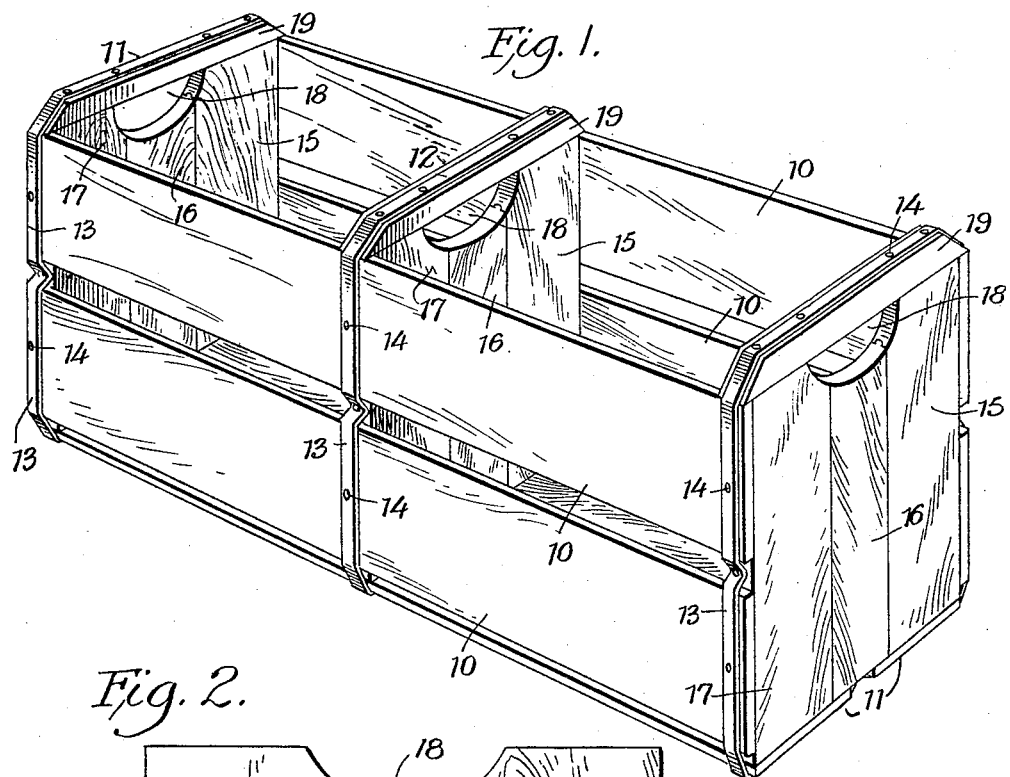

May 30, 1933.  J. F. TOWNSEND  1,911,728
FIELD BOX HEAD
Filed May 1, 1931  4 Sheets-Sheet 1

Inventor,
J. F. Townsend,
Attorney

May 30, 1933.　　　J. F. TOWNSEND　　　1,911,728
FIELD BOX HEAD
Filed May 1, 1931　　　4 Sheets-Sheet 2
Fig. 4.
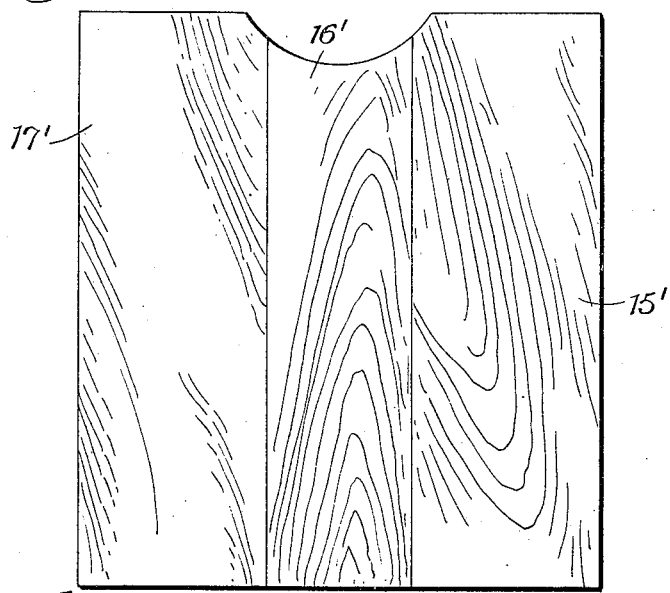
Fig. 5.
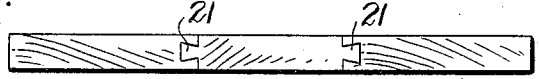
Fig. 6.
Fig. 7.
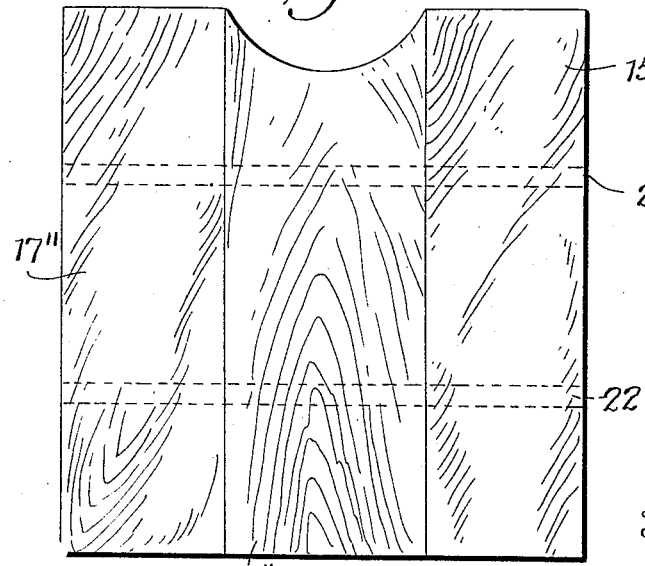
Inventor
J. F. Townsend,
By
Attorney May 30, 1933.  J. F. TOWNSEND  1,911,728
FIELD BOX HEAD
Filed May 1, 1931  4 Sheets-Sheet 3
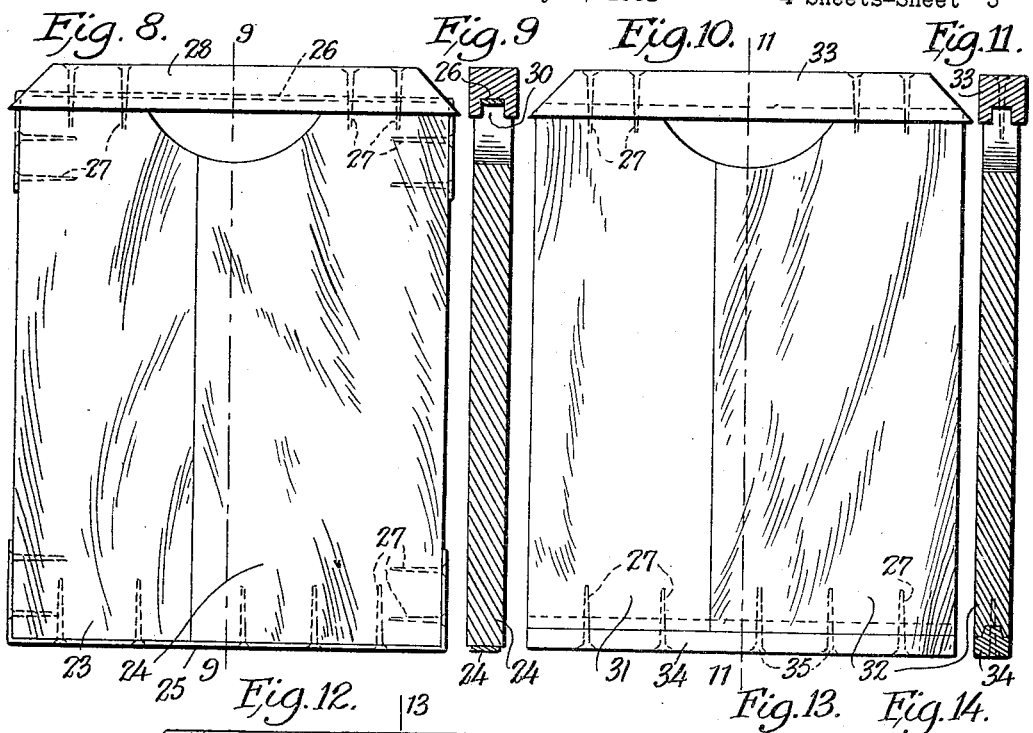
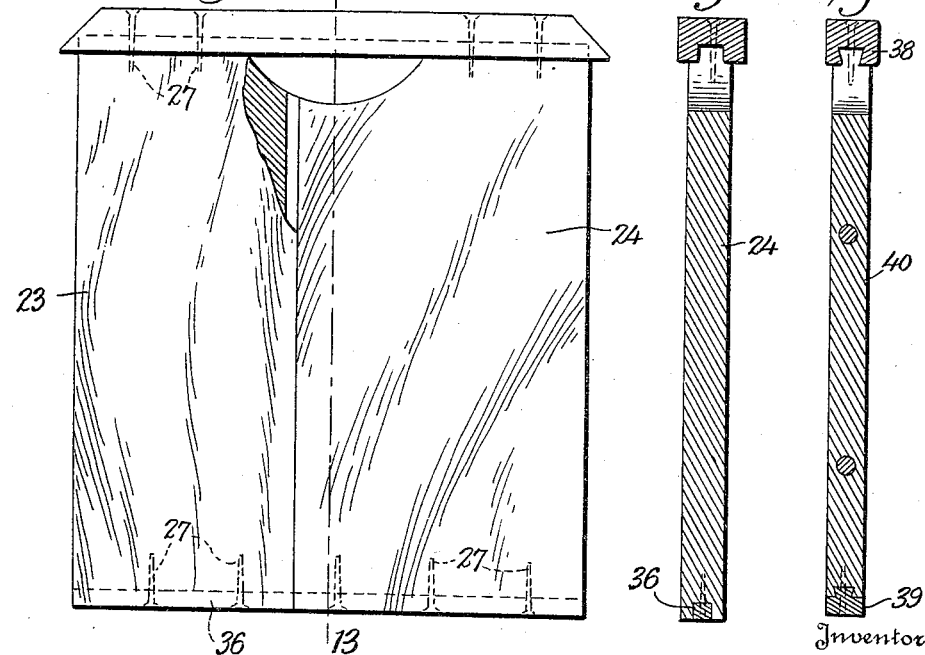
Inventor
J. F. Townsend.
By
Attorney May 30, 1933. J. F. TOWNSEND 1,911,728
FIELD BOX HEAD
Filed May 1, 1931 4 Sheets-Sheet 4
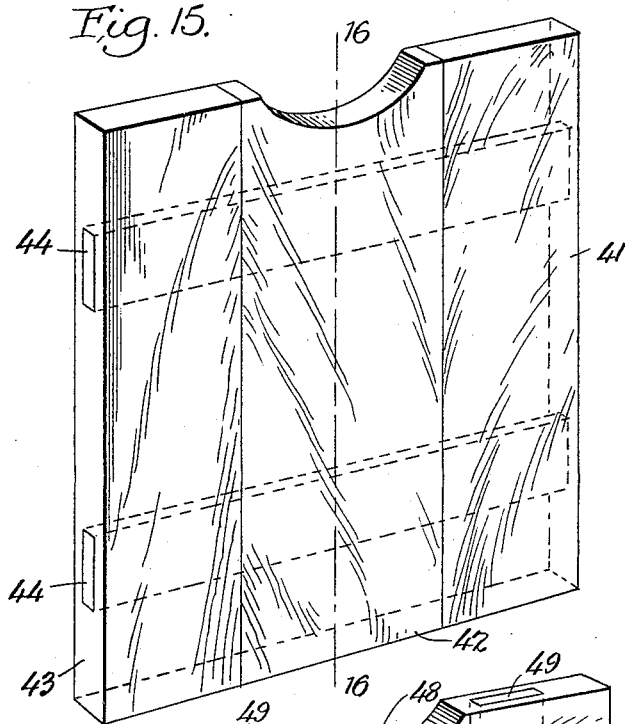
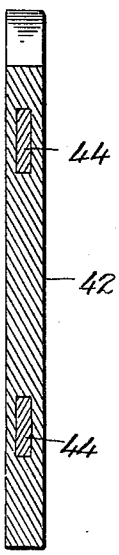
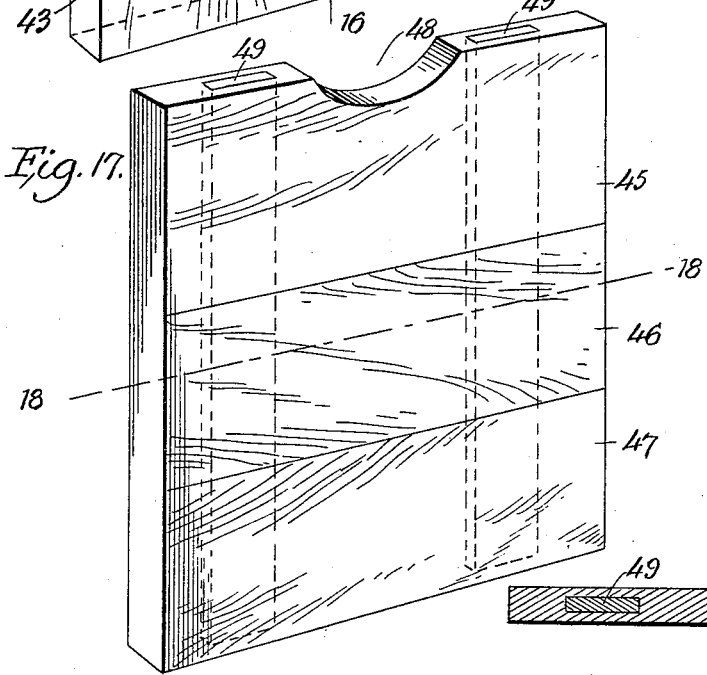
Inventor
J. F. Townsend.
By R. W. Dahn,
Attorney Patented May 30, 1933

1,911,728

UNITED STATES PATENT OFFICE

JACK F. TOWNSEND, OF LAKE WALES, FLORIDA

FIELD BOX HEAD

Application filed May 1, 1931. Serial No. 534,376.

My said invention relates to a field box head for use by fruit pickers and my general object is to provide a field box end or head that is strong and that is not easily broken or damaged and that is so arranged that the construction of the same will not damage fruit put into the box and so that narrow and short pieces of inexpensive lumber can be utilized. My field box head or end is unusually strong and can be manufactured and sold at a very reasonable price.

The life of an ordinary field box is relatively short and this is largely due to the kind of field box ends or heads now in use which are easily damaged and broken. In most cases it is not practical to repair these heads without considerable cost, while efforts at repairs leave rough places, projecting nails or other fasteners, etc., which frequently cause damage to fruit put into the boxes.

Field boxes are used in the picking of citrus and other fruits and sometimes are used in picking vegetables. The fruit is picked and put into the field box and a full field box containing citrus fruit will weigh approximately 100 pounds. After the fruit is picked and placed in the box the field boxes are loaded on trucks, the boxes being stacked on top of one another and hauled to the packing house which is in most cases several miles distant. The fruit is dumped from the field boxes at the packing house and the empty boxes, because of the necessity for speed in handling at the packing house, receive very rough usage. It is a common practice to take an empty box by one end and drag the box on an edge at the other end across the floor of the packing house to the loading platform or to trucks to be loaded and in this practice the field box ends are subjected to considerable abuse and are frequently seriously damaged.

Again in the necessity and practice of speed the empty field boxes are loaded on trucks at the packing house in such manner that the field box heads or ends such as are commonly in use are often damaged and broken on account of their construction. When the trucks arrive at the field or grove with the empty field boxes it is the custom to throw the field boxes out on the ground letting them land on end and this damages and breaks the field box heads or ends that are now in use, causing considerable cost in repairs and frequently the loss of a whole field box, because the work of repairing the ends or heads is so difficult and expensive that it is cheaper to throw away the box. Due to the construction of my field box end or head this great waste can be eliminated to a very considerable extent.

Previous efforts to build a field box head that is strong and that will stand up under service have frequently resulted in a type of field box head that when used will, on account of its construction, damage the fruit put into the field box and thus will cause a loss to the grower and the shipper. One of the principal objects of my field box head is to avoid such damage to fruit. My field box head is so constructed that it will not damage fruit under any ordinary use.

It has largely been customary in the past to use what is called a one-piece field box head or end and on account of the necessity of using wide wooden boards which must be clear lumber and which are expensive and scarce because of their width for this type of construction and on account of the nature of the wood a one-piece field box head with the grain of the wood in a vertical position will crack down the grain in seasoning, which weakens the head and eventually causes it to split. Florida and other States have laws covering measures and the contents of packages and Florida has a law providing for the size of a field box. Consequently, when these field boxes are made from one-piece box heads or ends and according to size as provided by Florida State laws, the ends may be of proper measurement at the time when they are made or at the time the field boxes are built up, but subsequently on being exposed to sunshine and rain and other weather conditions the one-piece heads which are placed with the grain of the wood in a vertical position will shrink very seriously in width, which results in an undersized field box. Much of the fruit is bought on the basis of field box measure and therefore when the field box, because of the shrinkage of the field box heads or ends after construction, has its cubic contents reduced, the buyer loses a corresponding portion of the proper contents of the field box.

My field box head or end is made from two or more narrow pieces of lumber placed vertically in the box. Narrow boards will not shrink in width in proportion to wide boards, and the vertical grain of narrow boards will not check or split. On the other hand, the vertical grain of wide boards such as the usual one-piece heads will check and split and break very easily. Narrow boards do not shrink lengthwise. For these reasons a head made from a plural number of narrow boards is much more durable than a one-piece head made from a wide board. Narrow boards can be secured from short lengths of lumber. It will thus be evident that a crate head made from narrow boards is more economical in cost, is stronger, will effect a saving in repairs, and will last much longer than a one-piece head. Therefore, there is practically no shrinkage in my field box head which insures both buyer and seller a dependable standard size package. Because of its construction my field box head is much stronger than usual and on this account will last longer than those now commonly in use. My method of building my field box head results in a head or end that is almost non-breakable under ordinary conditions and will be the means of saving large sums of money in the fruit industry.

My field box head is free from the use of what are known as "corrugated fasteners"; i. e. strips of stiff sheet metal corrugated transversely of their length and driven sidewise into parts to be secured together. These corrugated fasteners are frequently used in the construction of field box heads as a means for holding together rigidily boards placed in either vertical or horizontal position, but as the wood, on account of exposure to sunshine and rain and other weather conditions, will shrink (and owing also to the strenuous use to which the field boxes are put) as the wood shrinks the corrugated fasteners will work out and will protrude beyond the surface of the field box head and so will be liable to cut and bruise the fruit, causing it to decay and thus causing greater loss and waste. Also, when the corrugated fasteners are driven up into the wood of the field box head, this type of fastener in cutting its own way into the wood leaves a crack or a joint around it where water can seep in around the fastener. Since there is no ventilation around the fastener, the water seeping and soaking in around the same will cause the wood in the field box head to decay and rot. In many cases these corrugated fasteners will rust and in such event trouble always results. My method of constructing a field box head obviates and eliminates all possibility of such loss and damage.

Figure 2:
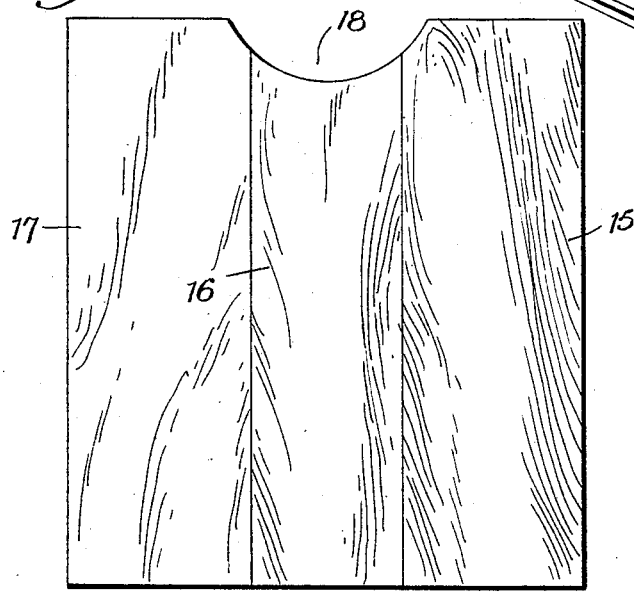
Figure 3:
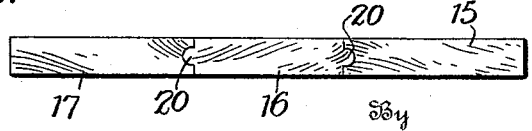

Referring to the drawings, which are made a part of this application and in which similar reference characters indicate similar parts:

Fig. 1 is a perspective of a field box for use by fruit pickers or others similarly engaged, Fig. 2 an elevation of a box head or end, Fig. 3, a bottom plan of the same, Fig. 4, an elevation of a modified form.

Fig. 5, a bottom plan of the same,

Fig. 6, an elevation of another modification,

Fig. 7, a side elevation of the same,

Figs. 8, 10 and 12, elevations of further modifications,

Figs. 9, 11 and 13, vertical sections on line 9—9, 11—11 and 13—13 of Figs. 8, 10 and 12 respectively, Fig. 14, a vertical section of another modification, Figs. 15 and 17, elevations of still further modifications, and Figs. 16 and 18, sections on line 16—16 and 18—18 of Figs. 15 and 17 respectively.

In the drawings there is illustrated a field box for use by fruit pickers and the like said box comprising side and bottom longitudinal members 10, usually of relatively light material. These side and bottom members are secured to the heads, indicated generally by reference character 11 and to an intermediate member indicated at 12, said intermediate member being usually of similar construction to the box ends or heads, though not necessarily so. The side and bottom members are attached, in the preferred construction, by means of the usual straps 13 of sheet metal which surround the field box in the planes of the heads and the intermediate member 12 and which are secured by means of small nails, indicated at 14. The bands 13 are approximately of the same width as the thickness of the heads and they are drawn tight about the box to hold the parts in place, the bands being mainly relied on for holding the side and bottom members in place, as usual, while the nails or brads 14 are intended mainly for holding the bands in place.

Each of the heads is here shown as consisting of three vertical strips 15, 16 and 17 which are firmly held together by means hereinafter described and which are provided with an opening at 18 for entrance of the hand of the user. To provide a secure handhold a strip 19 extends over the top of the head. This strip or handle is preferably somewhat thicker than the rest of the head and is firmly secured thereto, it being one advantage of the present construction that nails can be driven through handle 19 and into strips 15, 16, 17 without splitting the wood of said strips. The bands 13 also serve to hold the handles 19 securely in place, as usual.

Figs. 2 and 3 illustrate in detail one form of the invention, in which three strips 15, 16 and 17 are glued together at their meeting side faces, it being understood that preferably the grain of the strips run straight up and down and that the adjacent faces of strips 15 and 16 are flat so that when glue is applied and they are strongly pressed together these faces will lie in substantially the same plane, forming a strong joint from end to end of the head and across the entire thickness thereof, as is also true of the meeting of adjacent faces of strips 16 and 17. To insure that the fruit contacting surfaces of the heads shall be smooth and shall have all parts lying in the same plane I preferably provide some such means as shown in Fig. 3, where tongue and groove connections are illustrated at 20 which, as will be evident, prevent any offsetting of one strip with reference to another. Obviously any convenient number of strips may be used, three being shown for convenience of illustration.

The strips 15', 16', and 17' of Figs. 4 and 5 are or may be similar to those of Figs. 2 and 3 except that in addition to the glued joints the strips are held together by dovetails illustrated at 21 instead of by the tongue and groove arrangement shown in Figs. 2 and 3.

In Figs. 6 and 7 I have illustrated strips 15'', 16'', and 17'' which may also be glued together and additionally secured against relative movement and particularly against such movement as would offset a fruit contacting surface of one strip with respect to others, by means of dowel pins 22 of wood or metal. In this case the glue may be omitted, the dowel pins alone being then relied on to hold the parts of the head together.

In the form of the invention shown in Figs. 8 and 9 I use vertical strips 23, 24, having engaging faces which may form a joint of any conventional or preferred character, such as a smooth joint or a tongue-and-groove joint or a dove-tailed joint. They may be united at the joints by glue and may be further connected by wooden or metallic dowels, or by dowels alone, so as to keep their fruit-contacting faces absolutely in a common plane. For added reinforcement I may secure flat strips 25, 26 preferably of metal, to one or both ends of the head. These straps are preferably narrower than the thickness of strips 23, 24, and they may be secured by tacks or brads 27 to the ends and sides of the head. If desired, the two straps 25, 26 may be in one piece, completely encircling the head.

At the top of the head I provide a handle 28 which has a mortise, as shown in Fig. 9, fitting over tenons 30 on the vertical strips. The strap 26 lying on the tenons is thus completely enclosed or practically so and therefore cannot injure the hands of persons handling the box. The brads 27 that pass through the handle 28 also pass through the strap 26 into the strips 23 and 24 and thus coact with the strap to brace the end of the head and tie its parts together in very effective manner.

The modified form of Figs. 10 and 11 shows vertical strips 31, 32 and a handle 33 all of which may be as in Figs. 8 and 9. Instead of using a flat strap at the top of the head, the mortise in the handle rests directly on the tenoned upper ends of the vertical strips. At the lower end of the head a horizontal strip of wood or the like 34 is gained into the vertical strips and secured as by tacks 35 or glue or both, all of which makes a strong and inexpensive head.

In Figs. 12 and 13 I show a head generally similar to that of Figs. 10 and 11, but differing therefrom in that the horizontal spline 36 at the bottom of the head fits in a groove extending widthwise of the head and so located entirely within the confines of the united vertical strips.

Fig. 14 is like Fig. 11 except that dowel pins 37 are shown for uniting the vertical strips, and that the joints connecting the handle 38 and the footpiece 39 to the vertical strips 40 are dovetail joints.

In Figs. 15 and 16 I have shown a form of my invention in which a plurality of narrow strips of lumber 41, 42, 43 are connected by means of dowels 44 which are rectangular in section, the rectangular holes in the strips being formed by a mortising machine and the rectangular dowels being driven into them. Glue may be applied to the vertical joints between the strips if desired, and the dowels may also be glued to make the union between all parts of the head more permanent and secure.

In Figs. 17 and 18 there is shown a head consisting of strips 45, 46 and 47 arranged horizontally with a space at 48 for accommodating the hand of the user. The strips are connected by rectangular dowels, substantially as in Figs. 15 and 16 except that the dowels extend vertically instead of horizontally. Here also, as in the modification just previously described, glue may be used in the joints between strips and on the dowels.

It will be understood as to all forms of my invention that where other means are employed for connecting the strips, glue may be employed at appropriate points for further security, as at joints between strips or around dowels, etc. It will be obvious also that I do not limit myself to the use of two or three strips but may use any suitable number for a head and, in general, the shapes, proportions, securing means, etc., may be varied in ways that will suggest themselves to those skilled in the art, the essential thing being to use narrow strips in such a way that they may be rigidly united so as to function as a single piece and to prevent such relative offsetting of the strips as would cause one to project with reference to another so as to tend to injure the fruit in the box. For the reasons stated I do not confine myself to the specific construction shown in the drawings and described in the specification but only as indicated in the appended claims.

Having thus fully described my said invention, what I claim as new and desire to secure by Letters Patent, is:

1. A field box wall member comprising a plurality of strips of wood arranged with their edges contacting each other, all of said strips having registering holes intermediate their surfaces, the holes being positioned at points interiorly removed from the opposite ends of the strips and being normal to the contacting edges thereof, and dowels corresponding in length to the width of the wall member snugly fitted in said holes for uniting the strips, substantially as set forth.

2. A field box wall member comprising a plurality of strips of wood, said strips having juxtaposed edges and having a hole extending through all the strips from edge to edge of the wall member, said hole being located at a substantial distance from both ends of the strips, and a rigid dowel member extending through said hole substantially from edge to edge of the wall member.

3. A field box wall member comprising a plurality of strips of wood, said strips having juxtaposed edges and having a hole running crosswise of the wall member intermediate the surfaces of the strips, said hole being located at a substantial distance from both ends of the strips and a wide flat dowel member fitting in said hole, said dowel member extending substantially from edge to edge of the wall member.

4. A field box wall member comprising a plurality of strips of wood arranged with their edges contacting each other, all of said strips having registering holes intermediate their surfaces, the holes being positioned at points interiorly removed from the opposite ends of the strips and being normal to the contacting edges thereof, and wide flat dowels corresponding in length to the width of the wall member snugly fitted in said holes for uniting the strips, substantially as set forth.

In testimony whereof I affix my signature.

JACK F. TOWNSEND.